US011350005B2

(12) United States Patent
Ochi et al.

(10) Patent No.: US 11,350,005 B2
(45) Date of Patent: May 31, 2022

(54) TECHNIQUE FOR CONVEYING READING UNIT WHILE PRESSED AGAINST SHEET

(71) Applicant: CANON KABUSHIKI KAISHA, Tokyo (JP)

(72) Inventors: Junichi Ochi, Mishima (JP); Yohei Suzuki, Mishima (JP); Miho Kaiga, Sunto-gun (JP); Koji Kawamura, Yokohama (JP); Shinkichi Yamamoto, Sunto-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/031,452

(22) Filed: Sep. 24, 2020

(65) Prior Publication Data

US 2021/0099594 A1    Apr. 1, 2021

(30) Foreign Application Priority Data

Sep. 30, 2019   (JP) .............................. JP2019-180720

(51) Int. Cl.
*H04N 1/04*    (2006.01)
*H04N 1/00*    (2006.01)

(52) U.S. Cl.
CPC ..... *H04N 1/00615* (2013.01); *H04N 1/00557* (2013.01); *H04N 1/00795* (2013.01)

(58) Field of Classification Search
CPC ........... H04N 1/00615; H04N 1/00559; H04N 1/00795
See application file for complete search history.

(56) References Cited

U.S. PATENT DOCUMENTS

| | | | | |
|---|---|---|---|---|
| 4,754,337 A | * | 6/1988 | Nohtomi ............ | H04N 1/00127 358/401 |
| 5,517,332 A | * | 5/1996 | Barry .................. | H04N 1/0057 358/474 |
| 5,579,128 A | * | 11/1996 | Cheng ................. | H04N 1/1215 358/471 |
| 5,610,720 A | * | 3/1997 | Fujioka ............... | H04N 1/1017 355/25 |
| 6,640,082 B2 | * | 10/2003 | Mitomi ................ | H04N 1/0057 355/23 |
| 7,110,148 B2 | * | 9/2006 | Hasegawa ........... | H04N 1/2032 358/474 |
| 7,355,763 B2 | * | 4/2008 | Furihata .............. | G03G 15/60 271/273 |
| 7,554,701 B2 | * | 6/2009 | Hong ................... | H04N 1/193 358/474 |

(Continued)

FOREIGN PATENT DOCUMENTS

| | | |
|---|---|---|
| JP | 05-236194 A | 9/1993 |
| JP | 2003-179726 A | 6/2003 |

(Continued)

*Primary Examiner* — Cheukfan Lee
(74) *Attorney, Agent, or Firm* — Venable LLP

(57) ABSTRACT

An image forming unit forms an image on a sheet. The sheet is conveyed through a conveyance path after the image has been formed on the sheet. A reading unit reads the image formed on the sheet in the conveyance path. A conveyance guide constitutes a portion of the conveyance path and guides the sheet. A pressing unit presses the reading unit against the sheet. A connection unit connects the reading unit and the conveyance guide such that the reading unit and the conveyance guide move in an interlocked manner.

13 Claims, 13 Drawing Sheets

(56) References Cited

U.S. PATENT DOCUMENTS

| | | | | |
|---|---|---|---|---|
| 7,817,314 | B2* | 10/2010 | Hashimoto | H04N 1/00567 358/498 |
| 7,869,104 | B2* | 1/2011 | Murakami | B65H 1/04 358/498 |
| 8,004,727 | B2* | 8/2011 | van Os | H04N 1/1215 358/496 |
| 8,614,840 | B2* | 12/2013 | Kobayashi | H04N 1/2032 358/475 |
| 8,757,755 | B2* | 6/2014 | Hoshi | B41J 29/393 347/14 |
| 9,538,032 | B2* | 1/2017 | Ishizuka | H04N 1/028 |
| 10,027,833 | B2 | 7/2018 | Fukushima | |
| 10,142,515 | B2 | 11/2018 | Nishizawa et al. | |
| 2002/0001105 | A1* | 1/2002 | Takaki | H04N 1/00909 358/474 |
| 2003/0063337 | A1* | 4/2003 | Shirai | H04N 1/2032 358/498 |
| 2004/0223796 | A1* | 11/2004 | Iwata | H04N 1/00543 399/367 |
| 2007/0013123 | A1* | 1/2007 | Tsai | B65H 1/26 271/145 |
| 2007/0153336 | A1* | 7/2007 | Sheng | H04N 1/028 358/474 |
| 2008/0252948 | A1* | 10/2008 | Onishi | H04N 1/6033 358/504 |
| 2010/0165368 | A1* | 7/2010 | Matsuoka | H04N 1/401 358/1.9 |
| 2012/0105925 | A1* | 5/2012 | Shirai | H04N 1/2034 358/498 |
| 2013/0001050 | A1* | 1/2013 | Oshiro | G03G 21/00 198/780 |
| 2013/0135692 | A1* | 5/2013 | Uno | H04N 1/203 358/474 |
| 2013/0135698 | A1* | 5/2013 | Sumioka | H04N 1/00607 358/498 |
| 2015/0029563 | A1* | 1/2015 | Tao | H04N 1/00771 358/498 |
| 2016/0057300 | A1* | 2/2016 | Ishizuka | H04N 1/028 358/474 |
| 2016/0080595 | A1* | 3/2016 | Matsui | H04N 1/32363 358/401 |
| 2016/0255211 | A1* | 9/2016 | Kawabata | H04N 1/0032 358/1.14 |
| 2017/0244862 | A1* | 8/2017 | Nishizawa | H04N 1/00811 |

FOREIGN PATENT DOCUMENTS

| | | | |
|---|---|---|---|
| JP | 2012080170 A | * | 4/2012 |
| JP | 2017-146487 A | | 8/2017 |
| JP | 2017-208745 A | | 11/2017 |

* cited by examiner

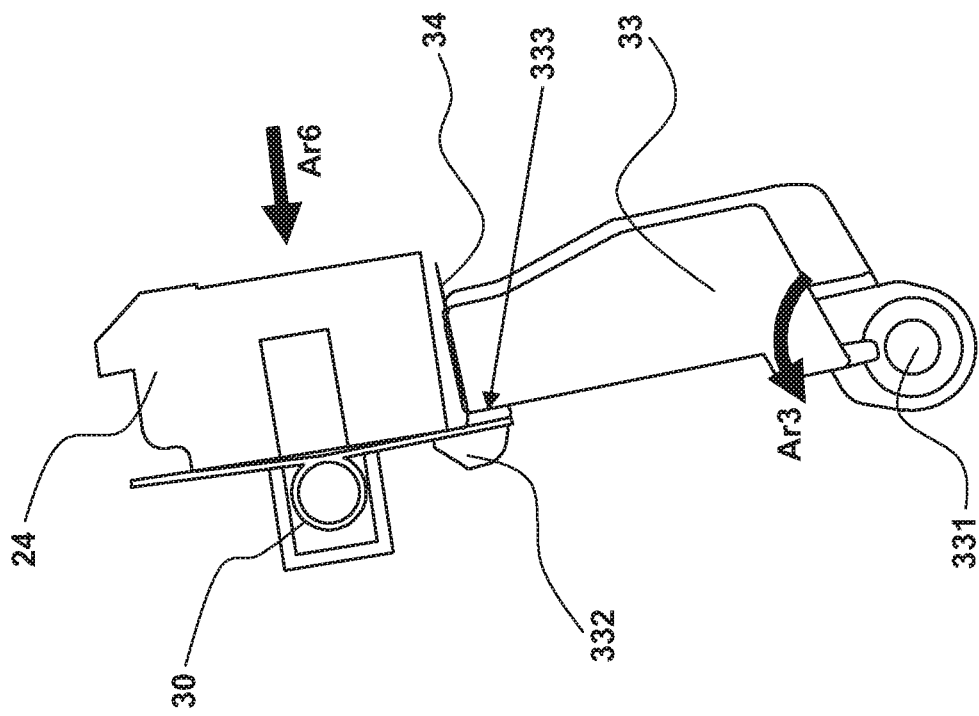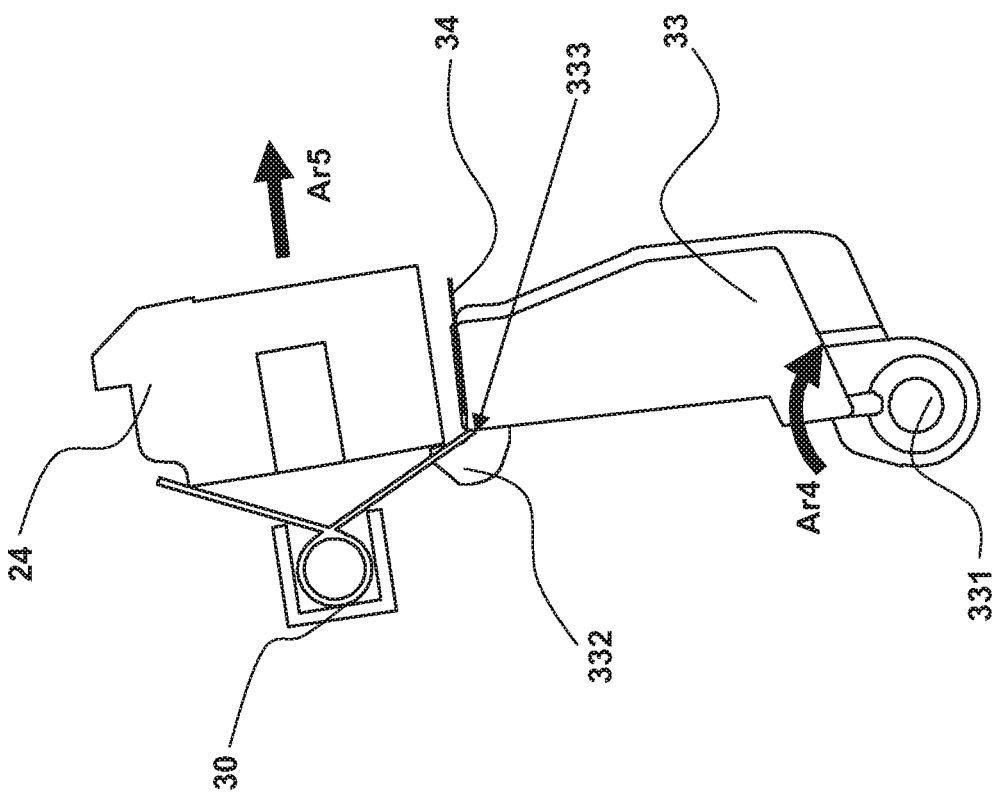

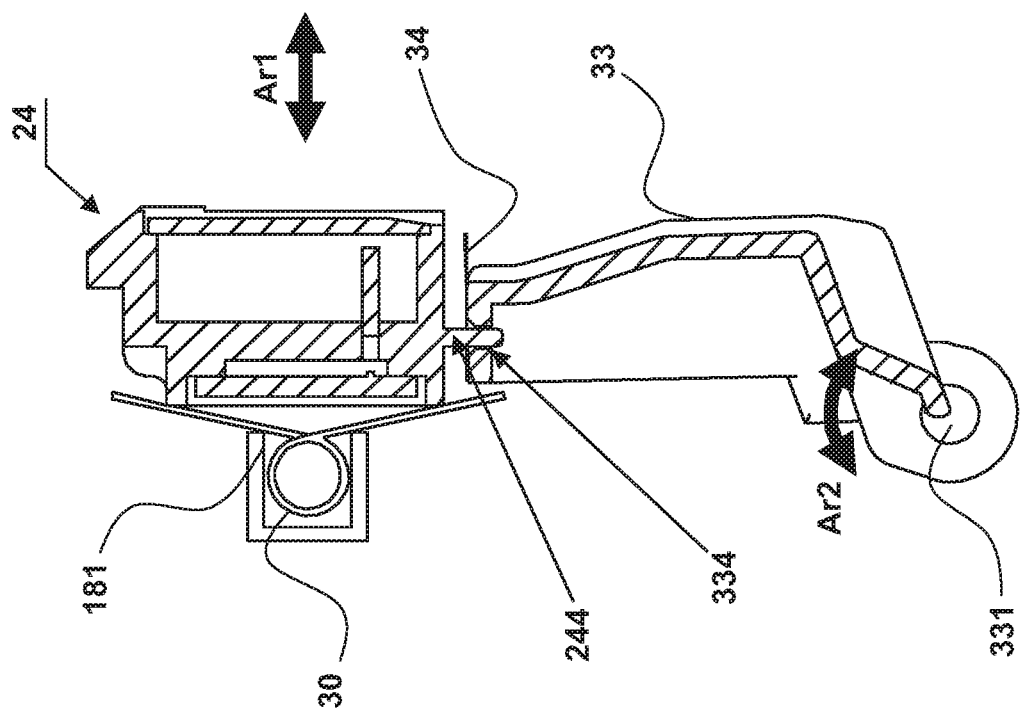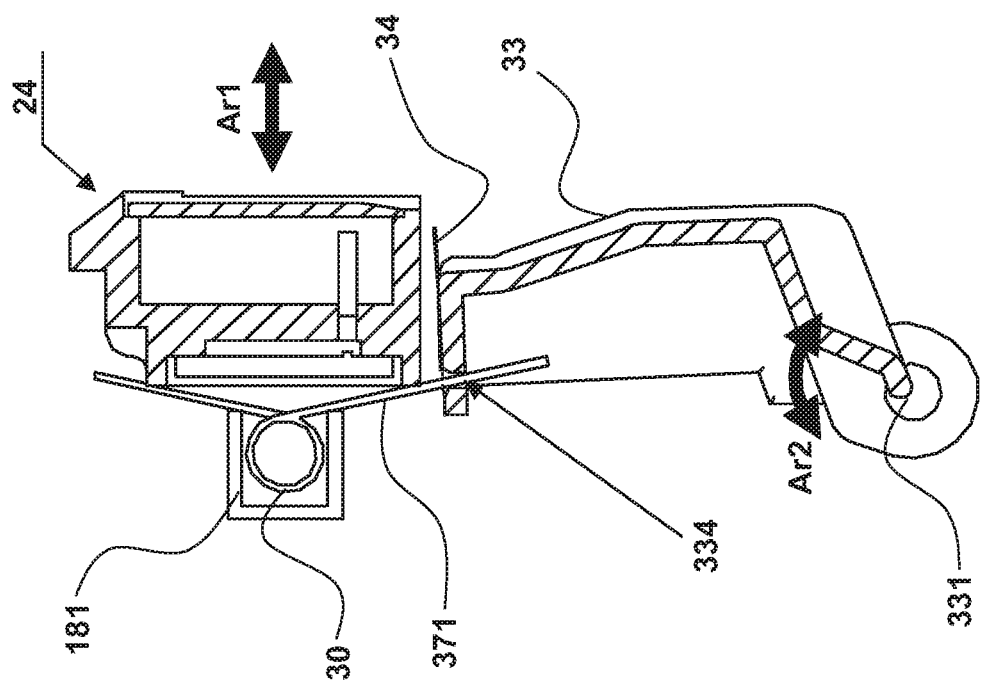

TECHNIQUE FOR CONVEYING READING UNIT WHILE PRESSED AGAINST SHEET

BACKGROUND OF THE INVENTION

Field of the Invention

The present invention relates to a technique for conveying a reading unit while the reading unit is being pressed against a sheet.

Description of the Related Art

According to Japanese Patent Laid-Open No. 2017-146487, an image forming apparatus has been proposed in which an image is formed on a sheet, and the image formed on the sheet is read while the sheet is being conveyed. In particular, in the technique disclosed in Japanese Patent Laid-Open No. 2017-146487, an image sensor is arranged in a conveyance path through which a sheet passes when images are to be formed on both sides of the sheet.

A conveyance guide may be provided around the image sensor in order for the image sensor to stably read a sheet and for the sheet to be stably conveyed. A configuration in which the image sensor is pressed against the sheet is advantageous in order for the image sensor to accurately come into focus on the image on the sheet. In this case, if the conveyance guide is fixed, jamming may occur due to the sheet being caught on a level difference that is generated between the conveyance guide and the image sensor.

SUMMARY OF THE INVENTION

The present invention provides an image forming apparatus comprising the following elements. An image forming unit forms an image on a sheet. A conveyance path forms a pathway through which the sheet, on which the image is formed, is conveyed. A reading unit reads the image formed on the sheet in the conveyance path. A conveyance guide forms a portion of the conveyance path and guides the sheet. A pressing unit presses the reading unit against the sheet. A connection unit connects the reading unit and the conveyance guide such that the reading unit and the conveyance guide move in an interlocked manner.

Further features of the present invention will become apparent from the following description of exemplary embodiments (with reference to the attached drawings).

BRIEF DESCRIPTION OF THE DRAWINGS

FIGS. 7A and 7B are diagrams illustrating a connection structure.

FIGS. 10A and 10B are diagrams illustrating a connection structure.

DESCRIPTION OF THE EMBODIMENTS

Figure 1:
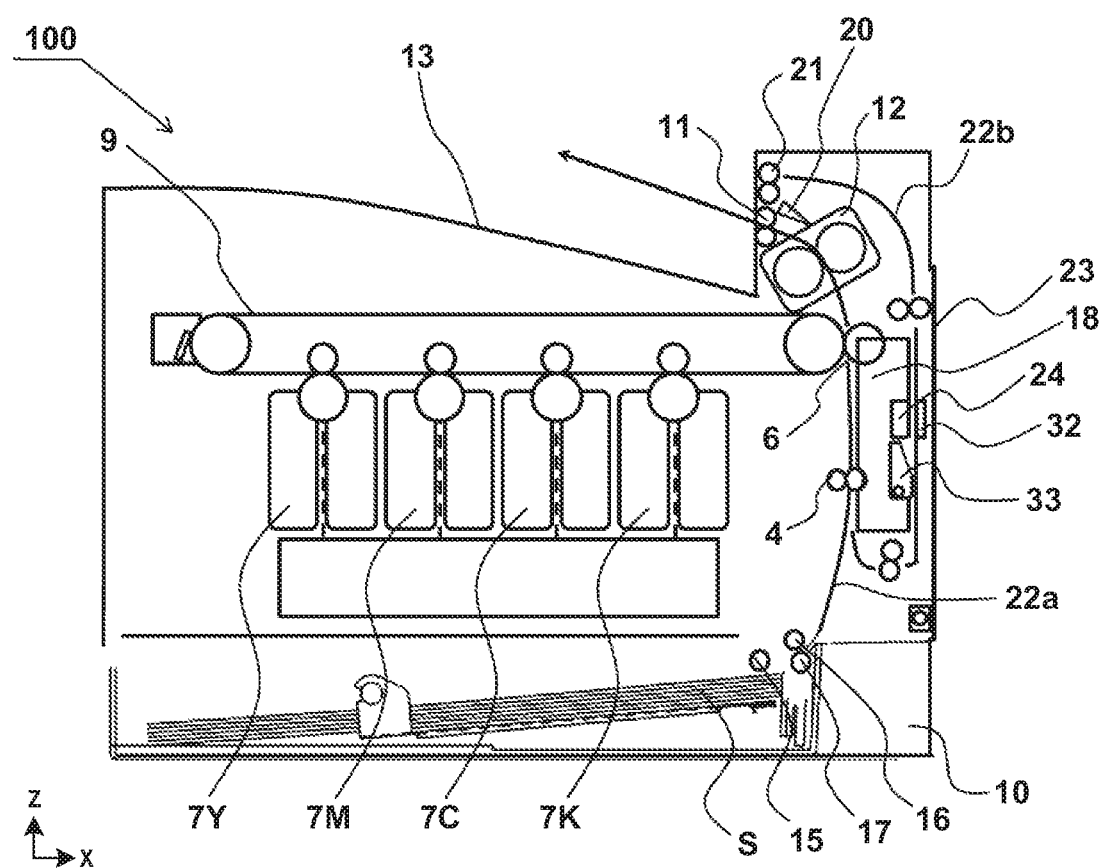
FIG. 1 is a diagram illustrating an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that three arrows indicating an x direction, a y direction, and a z direction may be illustrated in the drawings. This may aid the understanding of the positional relationship between the members.

First Application Example

Image Forming Apparatus

FIG. 1 is a cross-sectional view illustrating the outline of an image forming apparatus 100. Here, an electrophotographic method is adopted as the image forming method, but an inkjet method may also be adopted. Also, the present invention can also be applied to a monochrome printer in addition to a full color printer.

A sheet feeding cassette 10 is storage for housing a plurality of sheets S. A pickup roller 15 picks up the sheets S, and transfers the sheets S to a conveyance roller 16 and a separation roller 17. The conveyance roller 16 and the separation roller 17 separate, sheet by sheet, the plurality of sheets S, and convey a separated sheet S to a downstream side. The downstream side is a downstream side in a conveyance direction of the sheet S. A registration roller pair 4 performs skew correction on the sheet S, and conveys the sheet S to a secondary transfer unit 6 along a first conveyance path 22a.

Image forming units 7Y, 7M, 7C, and 7K respectively form toner images of yellow (Y), magenta (M), cyan (C), and black (K) on an intermediate transfer belt 9. The intermediate transfer belt 9 conveys the toner images to the secondary transfer unit 6. The secondary transfer unit 6 transfers the toner images from the intermediate transfer belt 9 to the sheet S. A fixing device 12 fixes a toner image on the sheet S by applying heat and pressure to the sheet S and the toner image. A sheet discharging roller 11 discharges the sheet S to a sheet discharging tray 13.

A flapper 20 guides the sheet S to a sheet discharging roller 11 or to an inversion roller 21. The inversion roller 21 takes in the sheet S from the first conveyance path 22a, and sends out the sheet S to a second conveyance path 22b. In general, when an image is also formed on a second face of a sheet S in which an image has been formed on its first face, the sheet S passes through the second conveyance path 22b, and is caused to return to the first conveyance path 22a again. With this, an image is formed on the second face.

A reading unit 24 and a conveyance guide 33 are provided in the second conveyance path 22b. An internal frame 18 supports the reading unit 24 and the conveyance guide 33 such that the reading unit 24 and the conveyance guide 33 can move. A white reference plate 32 is arranged so as to oppose the reading unit 24 with the second conveyance path 22b being interposed therebetween. The reading unit 24 reads the white reference plate 32 in order to create shading correction data. The white reference plate 32 is supported by a maintenance door 23. When a sheet S becomes jammed, a user opens the maintenance door 23 and removes the sheet S.

Reading Unit

Figure 2:
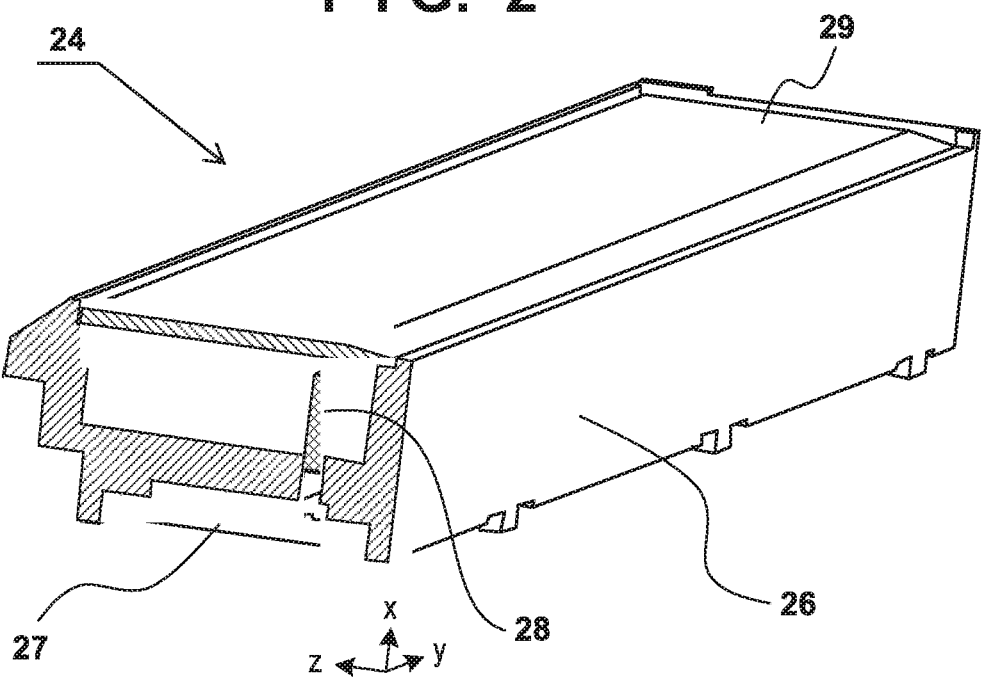
FIG. 2 is a diagram illustrating a reading unit.

FIG. 2 is a perspective view including a cross section of the reading unit 24. The reading unit 24 includes a casing 26, an electric board 27, a rod lens array 28, a contact glass 29, and the like. The rod lens array 28 forms an image on a sheet S on an image sensor mounted in the electric board 27. The contact glass 29 is provided on a front face side of the reading unit 24, and opposes the second conveyance path 22b and the white reference plate 32. A CPU mounted in the electric board 27 ascertains the print state of an image, executes failure diagnosis on the image forming apparatus 100, and the like, based on the result of reading the sheet S by the reading unit 24. In this example, the electric board 27 is provided in the vicinity of a back face of the reading unit 24.

Figure 3:
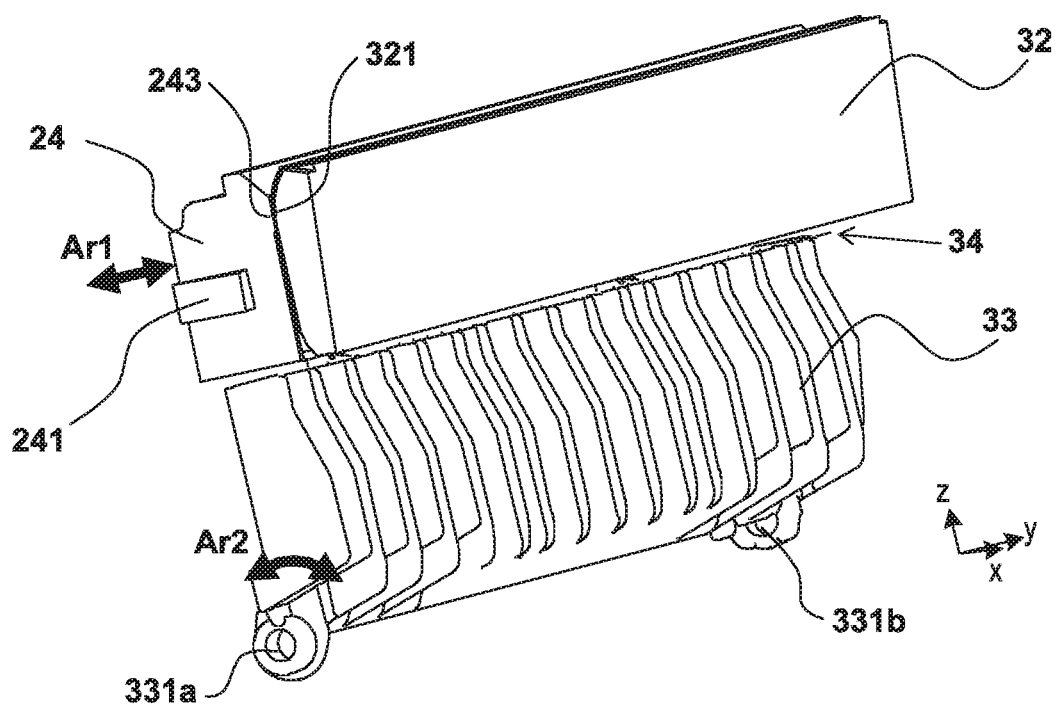
FIG. 3 is a diagram illustrating the reading unit and a conveyance guide.
Figure 4:
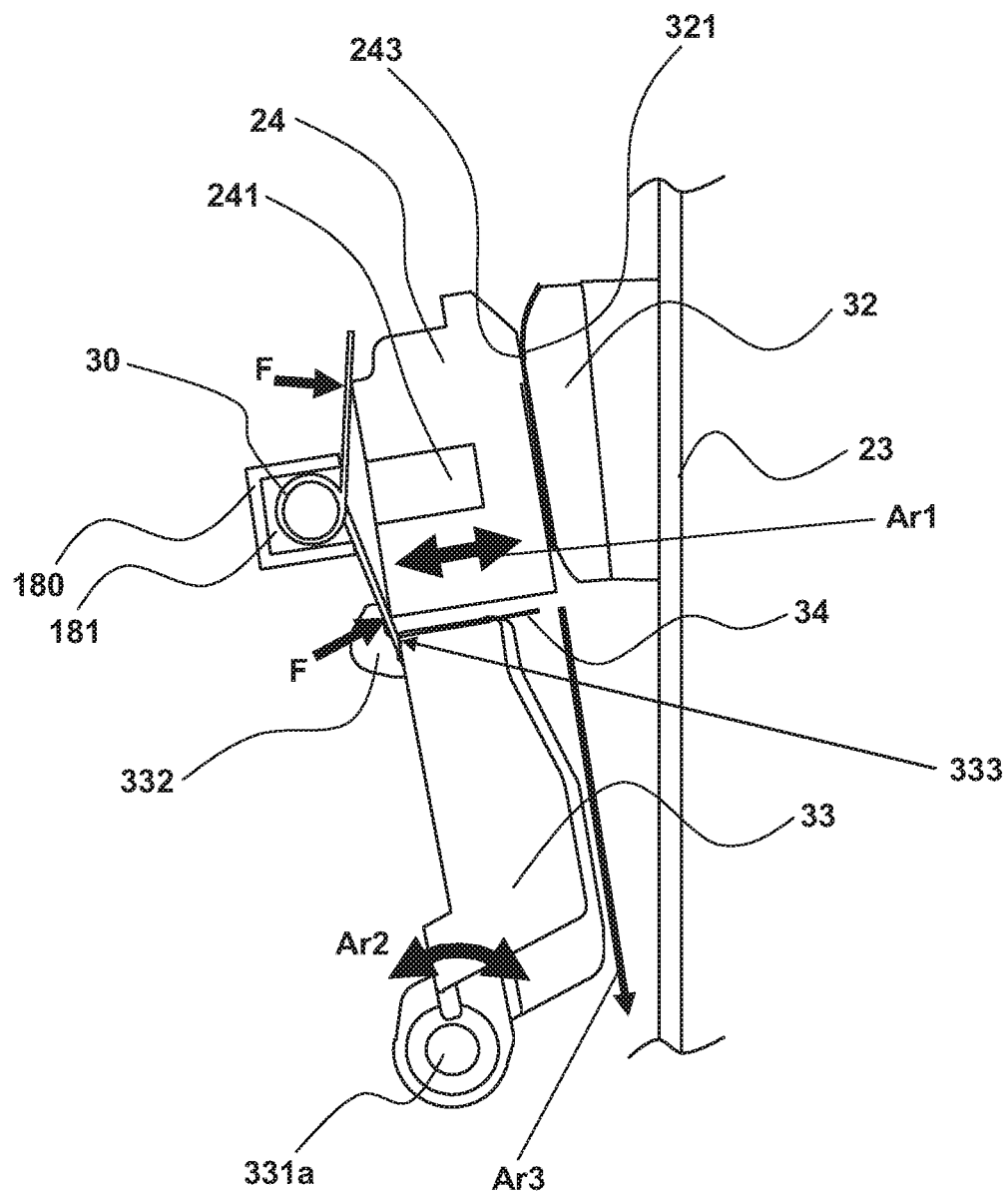
FIG. 4 is a diagram illustrating a connection structure.

FIGS. 3 and 4 are diagrams illustrating the positional relationship between the reading unit 24, the white reference plate 32, and the conveyance guide 33. An arrow Ar1 indicates the direction in which the reading unit 24 can move. Protruding portions 241 are provided on a right side wall and a left side wall of the reading unit 24. The reading unit 24 moves guided by the protruding portions 241. An arrow Ar2 indicates the direction in which the conveyance guide 33 can move. The conveyance guide 33 pivots about the pivot shafts 331a and 331b. In FIG. 4, an arrow Ar3 indicates the conveyance direction of the sheet S.

Abutting portions 243 are provided in both ends (right side wall, left side wall) of the sheet conveyance region (contact glass 29) of the reading unit 24. Abutting portions 321 are also provided in the white reference plate 32 so as to oppose the abutting portions 243. The abutting portions 243 protrude toward the white reference plate 32 relative to the contact glass 29. Similarly, the abutting portions 321 also protrude relative to a white face of the white reference plate 32. Therefore, as a result of the abutting portions 243 being brought into contact with the abutting portions 321, a gap (e.g., 0.3 mm to 0.5 mm) is secured between the contact glass 29 and the white face of the white reference plate 32. The sheet S is conveyed through this space. With this, fluttering of the sheet S is reduced, and the image sensor easily comes into focus on the image of the sheet S.

A white resin sheet is affixed to a surface of the white reference plate 32, which serves as a reference color when an image is read. Instead of affixing a resin sheet, the white reference plate 32 may be formed by a white resin. By opening the maintenance door 23, a user or a maintenance staff member can access the white reference plate 32 and the contact glass 29, and can clean them. The conveyance guide 33 is provided downstream of the reading unit 24 in the conveyance direction of the sheet S. In this example, the bottom face of the reading unit 24 opposes the top face of the conveyance guide 33.

Figure 5A:
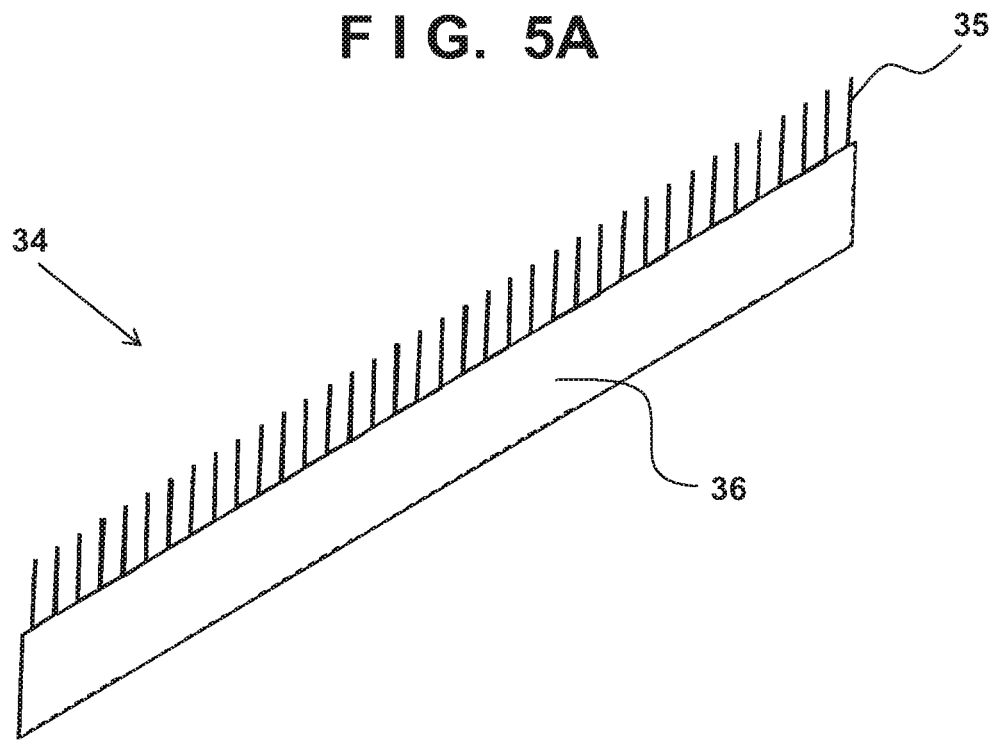
FIGS. 5A and 5B are diagrams illustrating a discharging member.
Figure 5B:
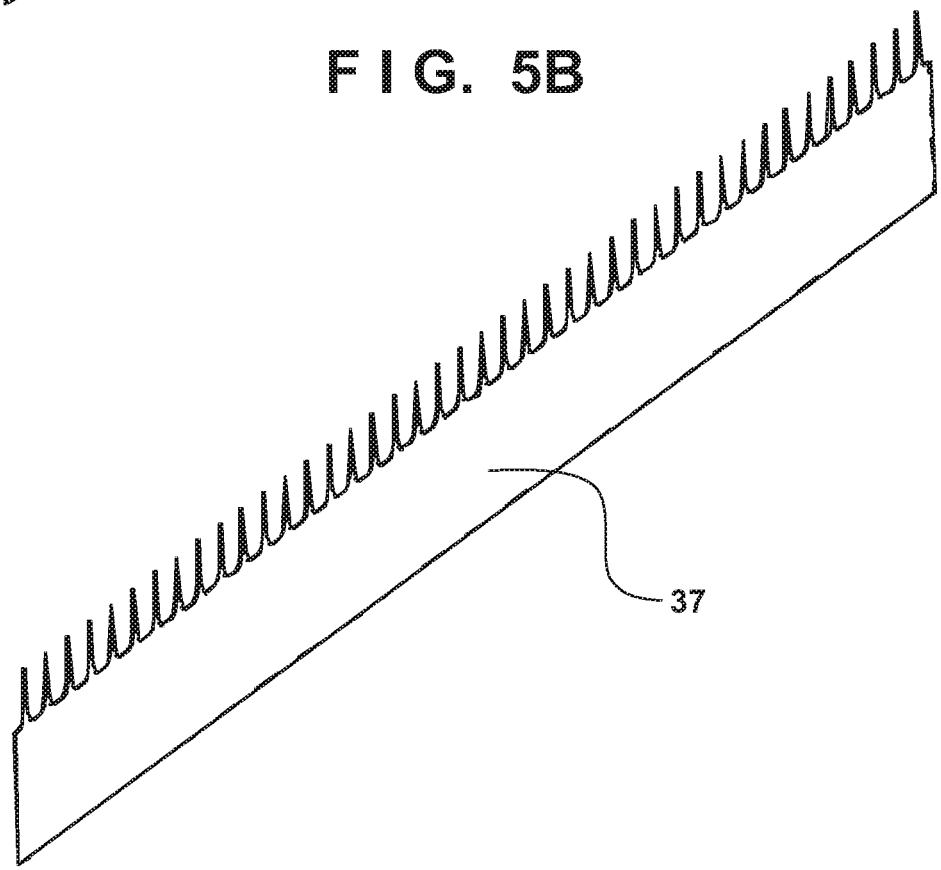

A discharging member 34 is provided in a wall face (top face), of the wall faces of the conveyance guide 33, that opposes the reading unit 24. The discharging member 34 may be also called a charge-reduction member, a destaticizing member, or a neutralization member. The discharging member 34 shown in FIG. 5A is a discharging brush including a plurality of conductive fiber bundles 35 and a metal foil 36. The plurality of conductive fiber bundles 35 are each electrically conductive to the metal foil 36. The discharging member 34 is fixed to the conveyance guide 33 by an adhesive or a double sided tape. The metal foil 36 is grounded. FIG. 5B shows a discharging needle 37 that can replace the discharging member 34. The discharging needle 37 includes a thin metal plate and a plurality of prickle shapes. The plurality of prickle shapes may be formed by performing press forming on a thin metal plate. The discharging member 34 may be replaced by a discharging cloth formed by a conductive non-woven fabric or fibers.

Figure 8A:
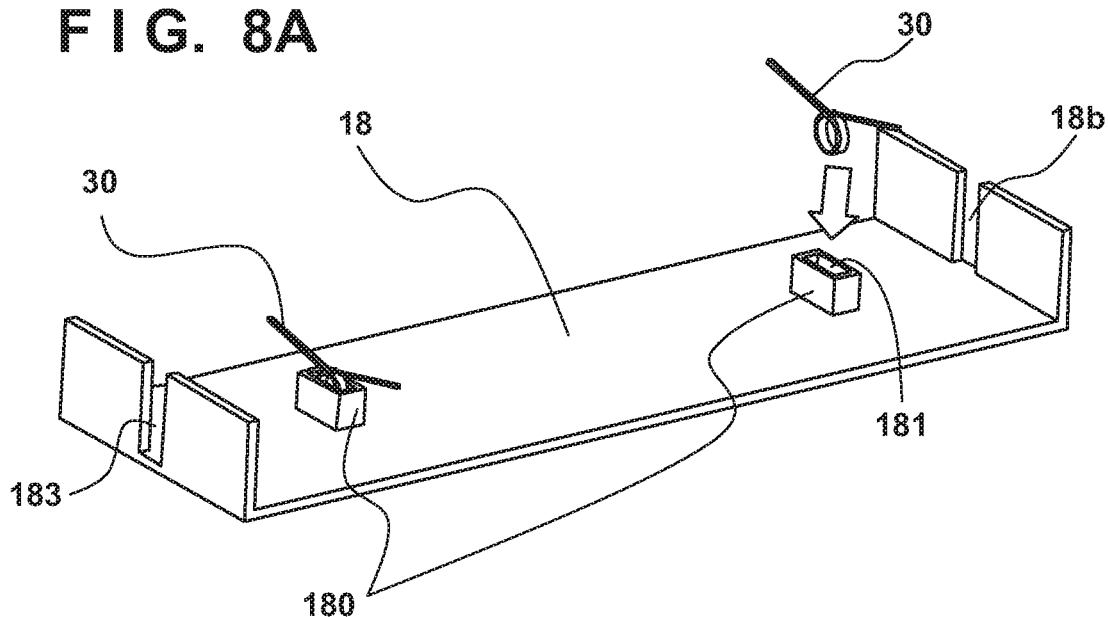
FIGS. 8A to 8C are diagrams illustrating a pressing member.

The protruding portions 241 shown in FIGS. 3 and 4 are slidably fitted into recessed portions 183 provided in the internal frame 18 shown in FIG. 8A. With this, the reading unit 24 can slide in the direction of the arrow Ar1.

As shown in FIG. 4, the internal frame 18 includes two holding members 180. The holding members 180 each include an attachment hole 181. As a result of a coil portion of a torsion coil spring 30 being fitted into the attachment hole 181, the holding member 180 holds the coil portion of the coil spring 30. Two arm portions of the torsion coil spring 30 press the reading unit 24 in the direction of an arrow F. Upon receiving the pressing force of the torsion coil spring 30, the reading unit 24 tends to be pushed out. Therefore, a stopper may be provided for restricting the pushed out amount of the reading unit 24. The stopper restricts the pushed out amount by coming into contact with the protruding portion 241.

In this way, as a result of pressing the reading unit 24 by an elastic body such as a spring, even if the position of the white reference plate 32, which is an opposing member, changes more or less, the reading unit 24 can follow the movement of the white reference plate 32. With this, the gap between the reading unit 24 and the white reference plate 32 can be kept at an appropriate amount. As a result of the two arm portions of the torsion coil spring 30 supporting the reading unit 24, the reading unit 24 is pressed in a well-balanced manner. In the first application example, as shown in FIG. 8A, two torsion coil springs 30 may be provided with a predetermined gap in a width direction of the sheet S. The width direction of the sheet S is in parallel to the longitudinal direction of the reading unit 24.

As shown in FIG. 4, one arm of the torsion coil spring 30 presses the reading unit 24 and the conveyance guide 33. A contact portion 333 provided in the conveyance guide 33 directly receives a pressing force from the torsion coil spring 30. A hook-shaped engagement portion 332 provided in the conveyance guide 33 engages with a back face of the reading unit 24. With this, the reading unit 24 and the conveyance guide 33 are connected.

Figure 6:
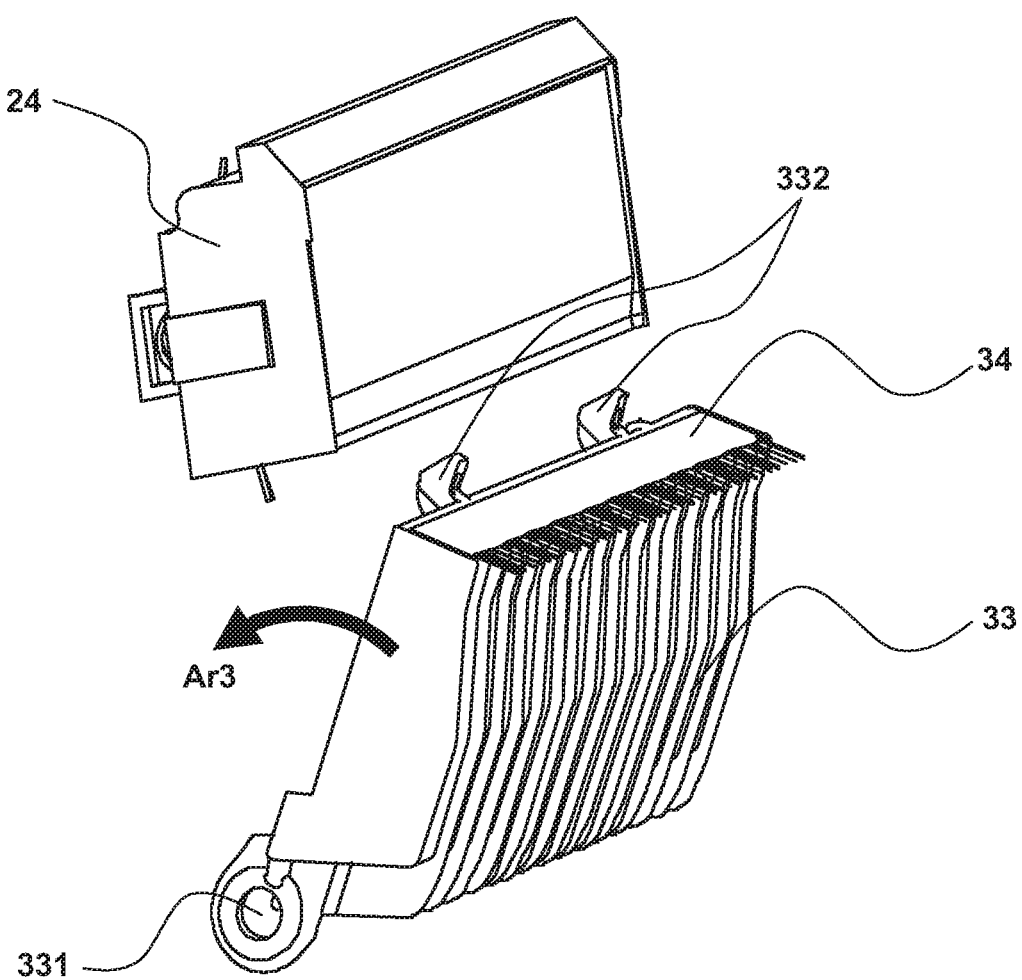
FIG. 6 is a diagram illustrating an assembly process.

As shown in FIG. 6, in the assembly process of the image forming apparatus 100, the reading unit 24 is attached to the internal frame 18. Next, the pivot shafts 331 of the conveyance guide 33 are attached to the image forming apparatus 100, and the conveyance guide 33 is caused to pivot in the direction indicated by an arrow Ar3. As a result of the conveyance guide 33 and the reading unit 24 warping, the engagement portions 332 pass under the reading unit 24 and engage with the back face of the reading unit 24. That is, the engagement portions 332 support the reading unit 24 by snap fitting.

The white reference plate 32 attached to the maintenance door 23 may more or less move due to the variation in component size, backlash, or warping of the maintenance door 23. When the position of the white reference plate 32 changes, the position of the reading unit 24 also changes. Moreover, the position of the conveyance guide 33 also changes following the movement of the reading unit 24. The sheet S is conveyed while being nipped by the conveyance roller pair on the upstream side and the conveyance roller pair on the downstream side, in the second conveyance path 22b. When the conveyance speed of the conveyance roller pair on the downstream side is higher than the conveyance speed of the conveyance roller pair on the upstream side, a pulling force is exerted in the sheet S. With this, the sheet S may push the reading unit 24 back toward the back face side. In this case as well, the reading unit 24 and the conveyance guide 33 can move following the sheet S. That is, the focusing state of the reading unit 24 relative to the sheet S is maintained.

As shown in FIG. 7A, when the reading unit 24 moves in the direction indicated by an arrow Ar5, the torsion coil spring 30 presses the contact portion 333 of the conveyance guide 33. The contact portion 333 is present on a back face of the conveyance guide 33. With this, the conveyance guide 33 pivots in the direction indicated by an arrow Ar4. Because the engagement portions 332 of the conveyance guide 33 engage with the back face of the reading unit 24, the positions of the reading unit 24, the conveyance guide 33, and the discharging member 34 are regulated in an interlocked manner. Therefore, the conveyance guide 33 and the discharging member 34 are unlikely to protrude from the reading unit 24.

As shown in FIG. 7B, when the reading unit 24 moves in the direction indicated by an arrow Ar6, the reading unit 24 tries to push the engagement portion 332 back. With this, the conveyance guide 33 pivots in the direction indicated by the arrow Ar3. When the reading unit 24 moves in the direction indicated by the arrow Ar6, the two arms of the torsion coil spring 30 are pushed back, and the torsion coil spring 30 shrinks. Moreover, when a force causing the conveyance guide 33 to pivot in the direction indicated by the arrow Ar3 is exerted to the conveyance guide 33, the torsion coil spring 30 comes into contact with the contact portion 333 of the conveyance guide 33, and therefore, the movement of the conveyance guide 33 is restricted. Therefore, the relative positional relationship between the reading unit 24 and the conveyance guide 33 is maintained, and the level difference between the reading unit 24 and the conveyance guide 33 in the conveyance direction of the sheet S is kept at an appropriate level difference. Because the discharging member 34 is held by the conveyance guide 33, the relative positional relationship between the reading unit 24 and the discharging member 34 is also maintained. With these facts, jamming of sheets S may not easily occur. Also, since the level difference is kept at a fixed amount, a passing sound may also be reduced that is generated by the sheet S at the level difference.

Incidentally, when the gap between the discharging member 34 and the contact glass 29, and the gap between the discharging member 34 and the sheet S increase, an expected discharging effect (reducing electric charge) cannot be obtained. On the contrary, if the discharging member 34 protrudes too much, the discharging member 34 rubs against the sheet S, and a conductive fiber of the discharging member 34 may come out or break away. If a conductive fiber is conveyed to the image forming unit 7 and the secondary transfer unit 6, an image failure may occur. If the discharging needle 37 is adopted as the discharging member 34, the sharp tip of the discharging needle 37 protruding toward the second conveyance path 22b may damage the sheet S or cause jamming. As a result of adopting the first application example, the gap between the discharging member 34 and the contact glass 29 and the gap between the discharging member 34 and the sheet S may be accurately kept at an appropriate amount. With this, the discharging performance of the discharging member 34 with respect to the sheet S and the contact glass 29 may be stably maintained. Also, an image failure caused by a conductive fiber of the discharging member 34 may not easily occur. Moreover, damage and jamming of the sheet S caused by the discharging needle 37 may not easily occur.

Holding Structure of Torsion Coil Spring

Figure 8B:
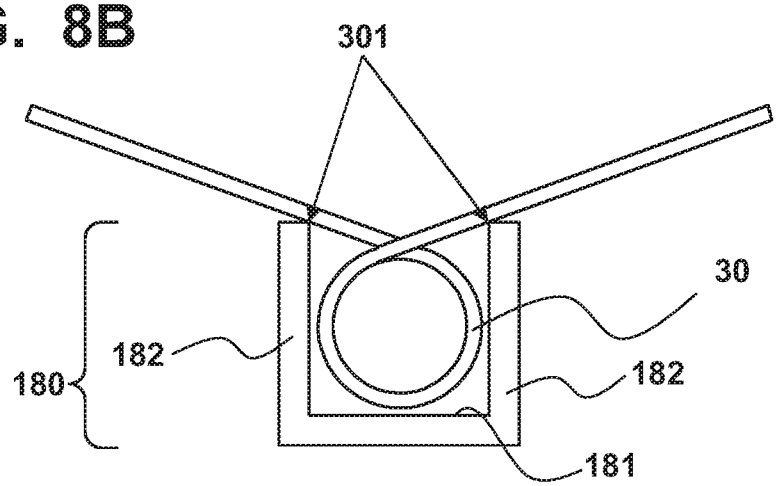

FIGS. 8A and 8B are diagrams illustrating the holding method of the torsion coil spring 30. When an assembly staff member or a maintenance staff member of the image forming apparatus 100 replaces the reading unit 24, the coil portion of the torsion coil spring 30 is inserted into the attachment hole 181 provided in the holding member 180 of the internal frame 18. As shown in FIGS. 8A and 8B, the shape of the holding member 180 is a box shape in which four wall faces 182 surround the attachment hole 181. The shape of the attachment hole 181 is square or rectangular, and the vertical and horizontal dimensions of the attachment hole 181 are set so as to be a little bit larger than the outer diameter and the width of the torsion coil spring 30. This is so that the holding member 180 does not hinder the operation of the torsion coil spring 30. After the torsion coil spring 30 has been set to the holding member 180, the reading unit 24 is attached to the internal frame 18. Here, the groove-like recessed portions 183 are fitted to the protruding portions 241 of the reading unit 24. With this, the reading unit 24 is slidably held by the internal frame 18.

Figure 9A:
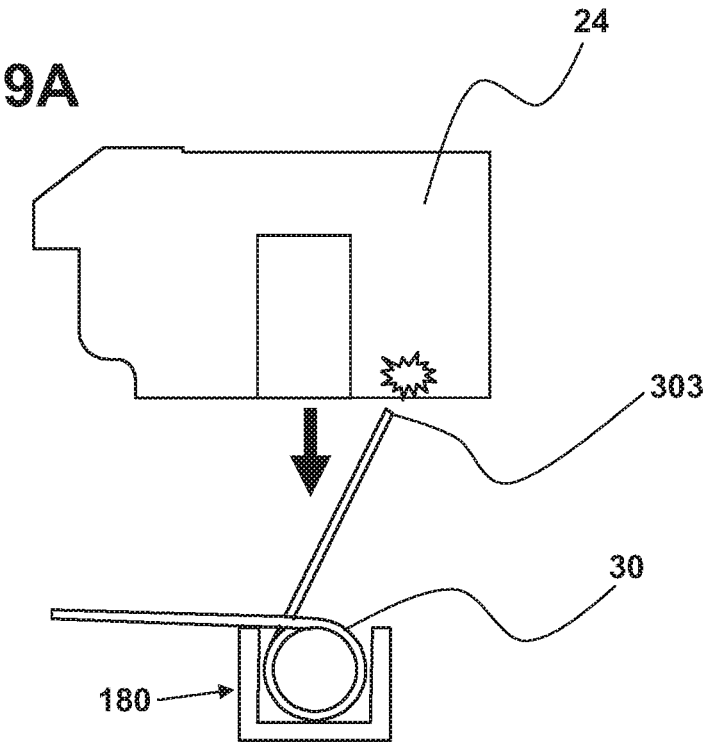
FIGS. 9A and 9B are diagrams illustrating the pressing member.

As shown in FIG. 8B, at a stage in which the torsion coil spring 30 is set to the attachment hole 181, the contact portions 301 respectively support both arms of the torsion coil spring 30. The contact portions 301 are respectively provided on the top faces of the opposing two wall faces 182. As a result of the contact portions 301 supporting the two arms, the posture of the torsion coil spring 30 is stabilized in the assembly process. With this, the ease of assembly is improved when the reading unit 24 is attached to the internal frame 18. If the arms are not supported, the posture of the torsion coil spring 30 is unstable, as shown in FIG. 9A, for example. In an extreme case, an arm tip portion 303 of the torsion coil spring 30 comes into contact with the back face of the reading unit 24, and the assembly may be hindered.

Figure 9B:
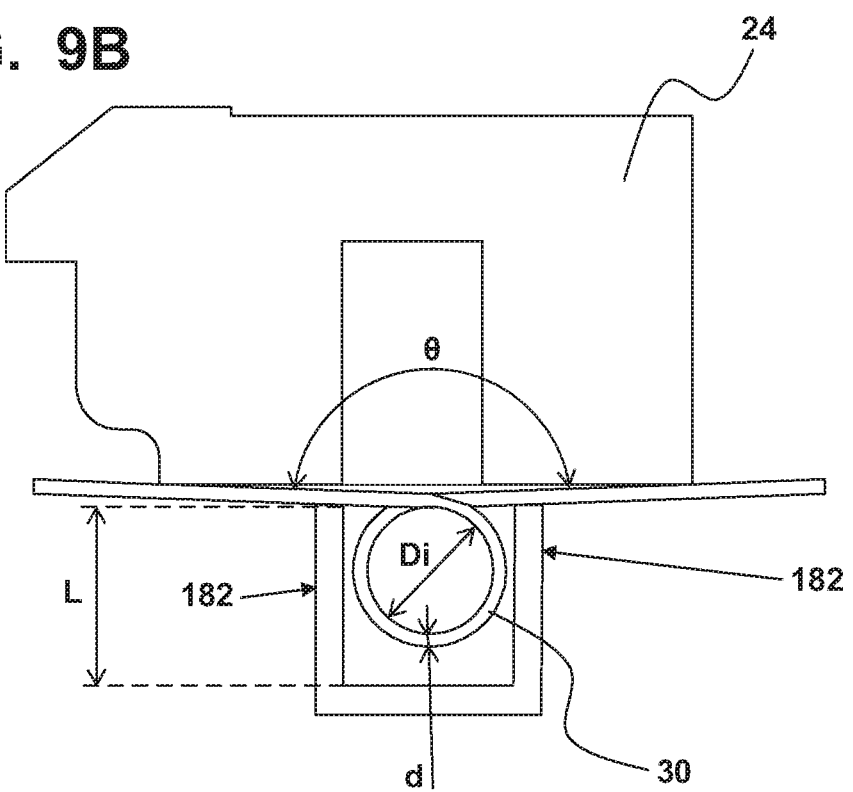

As shown in FIG. 9B, as a result of attaching the reading unit 24 to the internal frame 18, when the pressing force of the torsion coil spring 30 is exerted to the reading unit 24 as well, the wall faces 182 support the arm portions of the torsion coil spring 30. The opening angle θ of the torsion coil spring 30 is 180 degrees at the maximum.

Here, the height L of the two wall faces 182 of the holding member 180 need only be greater than or equal to the sum of an inner diameter Di and the wire diameter d of the torsion coil spring 30 (L≥Di+d). The two wall faces 182 need not come into contact with both arms of the torsion coil spring 30 until the reading unit 24 is attached to the internal frame 18. The opening angle A in a state in which an external force is not exerted to the torsion coil spring 30 need only be an angle to the degree such that attachment of the reading unit 24 to the internal frame 18 is not hindered.

Figure 8C:
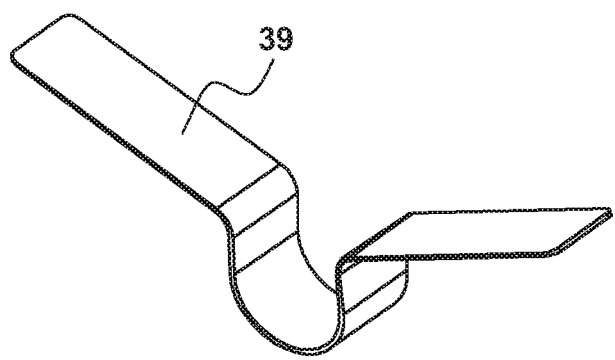

As shown in FIG. 8C, the torsion coil spring 30 may be replaced by a plate spring 39. The plate spring 39 is also provided with two arm portions and an intermediate portion (coil portion) that is provided so as to connect the two arm portions and has a shape conforming to the shape of the attachment hole 181. According to FIG. 8C, the intermediate portion has a U shape.

Second Application Example

As shown in FIG. 10A, one arm portion 371 of the torsion coil spring 30 that applies pressure to the reading unit 24 engages with or is fitted to a recessed portion 334 provided in a top face of the conveyance guide 33. In this way, because the reading unit 24 and the conveyance guide 33 are connected by the arm portion 371 and the recessed portion 334, the reading unit 24 and the conveyance guide 33 move in an interlocked manner. That is, the reading unit 24 and the conveyance guide 33 move together with each other. In FIG. 10A, the recessed portion 334 is a through hole, but may also be a groove having a bottom face.

In the second application example, the torsion coil spring 30 functions as a pressing unit that presses the reading unit 24, and the torsion coil spring 30 also functions as a connection unit that connects the reading unit 24 and the conveyance guide 33. With this, the positional relationship between the reading unit 24 and the conveyance guide 33 is maintained in a predetermined relationship. Similarly, the positional relationship between the reading unit 24 and the discharging member 34 is also maintained in a predetermined relationship. Note that the discharging member 34 may also be provided with a through hole into which the arm portion 371 is inserted. In this way, as a result of using the arm portion 371 of the torsion coil spring 30 as a connection unit, the engagement portion 332 is not needed.

In the assembly process, first, the conveyance guide 33 is attached to the image forming apparatus 100. Next, the arm portion 371 of the torsion coil spring 30 is inserted into the recessed portion 334 of the conveyance guide 33. The coil portion of the torsion coil spring 30 is inserted into the attachment hole 181 of the internal frame 18. Next, the reading unit 24 is attached to the internal frame 18.

Third Application Example

As shown in FIG. 10B, the reading unit 24 includes a protruding portion 244. The protruding portion 244 is provided in a side face, of the side faces of the reading unit 24, that is positioned closest to the conveyance guide 33. This side face opposes the conveyance guide 33 and the discharging member 34.

The conveyance guide 33 includes a recessed portion 334. As shown in FIG. 10B, the recessed portion 334 may be a through hole, or may also be a groove having a bottom face. The protruding portion 244 engages with or is fitted to the recessed portion 334. Because the protruding portion 244 engages with the recessed portion 334 with a small gap, the movements thereof are unlikely to be hindered by each other. The configuration may also be such that the reading unit 24 includes a recessed portion and the conveyance guide 33 includes a protruding portion.

Since the protruding portion 244 is engaged with the recessed portion 334, the reading unit 24 is substantially connected to the conveyance guide 33, and the reading unit 24 and the conveyance guide 33 move in an interlocked manner. Similarly, the discharging member 34 fixed to the conveyance guide 33 also moves interlocked with the reading unit 24. With this, the positional relationship between the reading unit 24 and the conveyance guide 33 is maintained in a predetermined relationship. Similarly, the positional relationship between the reading unit 24 and the discharging member 34 is also maintained in a predetermined relationship.

In the assembly process, first, the coil portion of the torsion coil spring 30 is inserted into the attachment hole 181 of the internal frame 18. Next, the protruding portion 244 of the conveyance guide 33 is engaged with the recessed portion 334 of the reading unit 24. Next, the conveyance guide 33 and the reading unit 24 are caused to pivot about the pivot shaft 331, and the reading unit 24 is attached to the internal frame 18.

Fourth Application Example

Figure 11A:
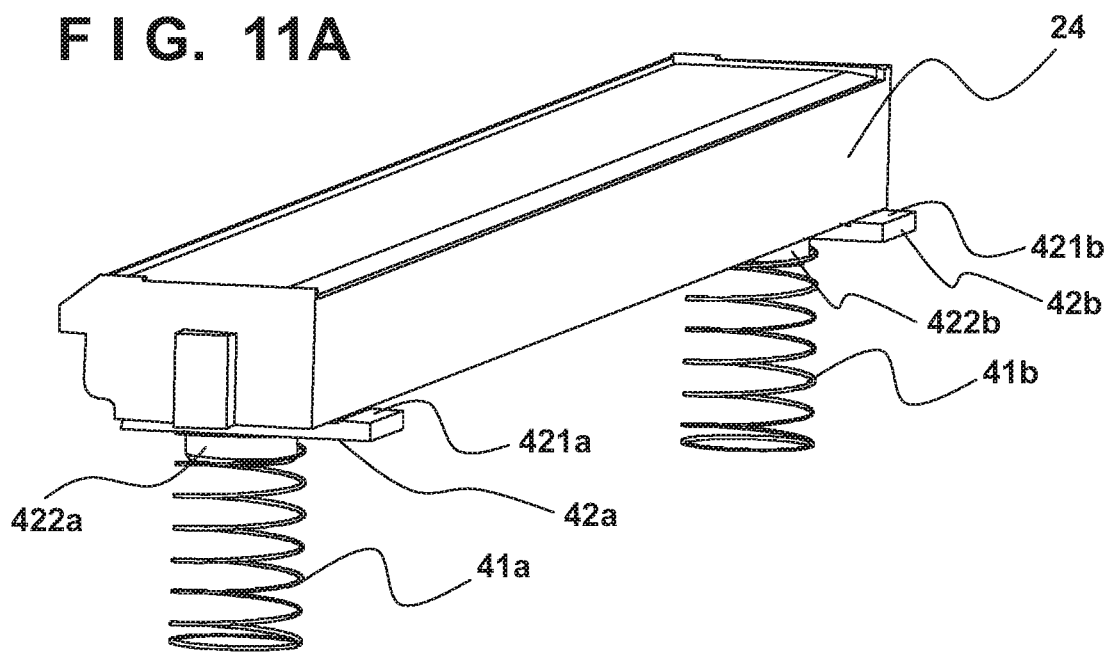
FIGS. 11A and 11B are diagrams illustrating a pressing member and a connection structure.

As shown in FIG. 11A, two compression springs 41a and 41b are provided in the vicinity of both ends of the reading unit 24. In this specification, letters appended at the end of the reference signs may be omitted when common items are described.

A contact member 42a is interposed between the compression spring 41a and the reading unit 24. A contact member 42b is interposed between the compression spring 41b and the reading unit 24. The compression springs 41a and 41b respectively press the reading unit 24 via the contact members 42a and 42b. The compression spring 41a is engaged with or fixed to a columnar protruding portion 422a provided in the contact member 42a. The compression spring 41b is engaged with or fixed to a columnar protruding portion 422b provided in the contact member 42b. The contact member 42a includes a contact portion 421a that engages with the conveyance guide 33. The contact member 42b also includes a contact portion 421b that engages with the conveyance guide 33. Note that the contact members 42a and 42b may be omitted. For example, the winding diameters of the compression springs 41a and 41b may be set to a relatively large size such that the end faces of the compression springs 41a and 41b come into contact with both of the reading unit 24 and the conveyance guide 33. With this, the compression springs 41a and 41b can press both of the reading unit 24 and the conveyance guide 33.

Figure 11B:
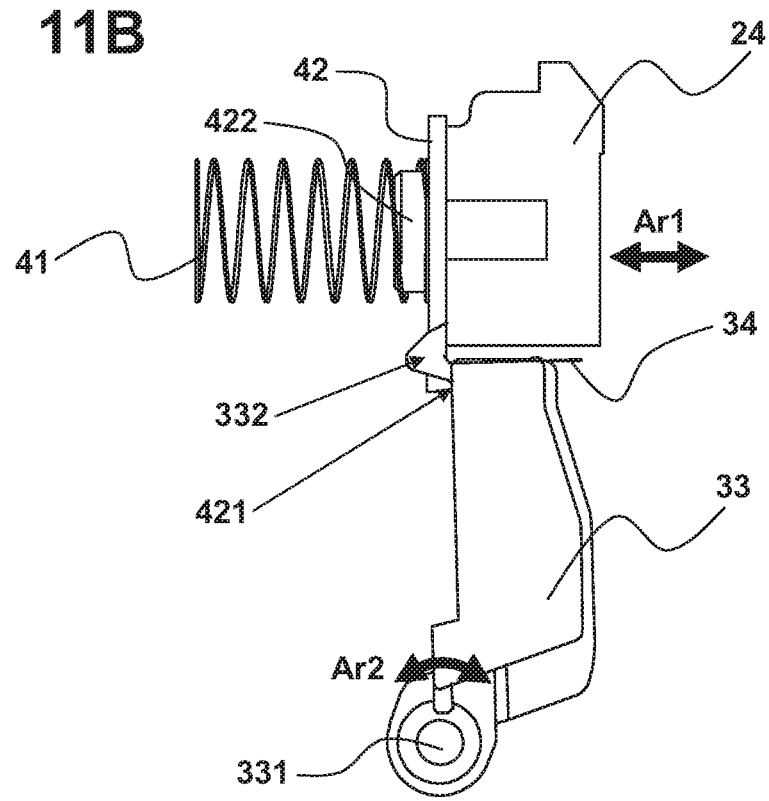

As shown in FIG. 11B, the compression springs 41 are in contact with the reading unit 24 and the conveyance guide 33 via the contact members 42. The contact portions 421 of the contact members 42 are in contact with the conveyance guide 33. When portions of the compression springs 41 directly come into contact with the conveyance guide 33, the contact members 42 may be omitted.

According to FIG. 11B, the conveyance guide 33 includes an engagement portion 332. However, the engagement portion 332 may be replaced with the engagement structure that has been described in relation to FIG. 10A or 10B.

When the reading unit 24 moves so as to extend the compression springs 41, the contact portions 421 press the conveyance guide 33, and the conveyance guide 33 pivots in a clockwise direction. When the reading unit 24 moves so as to shrink the compression springs 41, the reading unit 24 presses the engagement portion 332, and the conveyance guide 33 pivots in a counter-clockwise direction. In this way, the reading unit 24 and the conveyance guide 33 move in an interlocked manner. With this, the positional relationship between the reading unit 24 and the conveyance guide 33 are maintained in a predetermined relationship. Since the discharging member 34 is fixed to the conveyance guide 33, the positional relationship between the reading unit 24 and the discharging member 34 is also maintained in a predetermined relationship.

In the assembly process, first, the contact members 42 are fixed to the reading unit 24. The contact members 42 may be adhered to the reading unit 24, or may be fixed by engagement portions, which are not illustrated. Next, the compression springs 41 are fitted to the protruding portions 422. Next, the conveyance guide 33 is caused to pivot about the pivot shafts 331, and the engagement portion 332 engages with the reading unit 24 by snap fitting.

When the engagement portion 332 is replaced by the engagement structure described in relation to FIG. 10A or 10B, first, the compression springs 41 are fixed to the internal frame 18. Next, the contact members 42 are attached to the reading unit 24. Next, the reading unit 24 is engaged with the conveyance guide 33, and the contact members 42 engage with the back face of the conveyance guide 33. Moreover, as a result of causing the conveyance guide 33 and the reading unit 24 to pivot, the compression springs 41 are attached to the back face of the reading unit 24, and the protruding portion 241 is fitted into the recessed portion 183 of the internal frame 18.

Fifth Application Example

In the fourth application example, the compression springs 41a and 41b are arranged side by side in a direction orthogonal to the conveyance direction of the sheet S, and in parallel to the longitudinal direction of the reading unit 24. In a fifth application example illustrated in FIGS. 12A and 12B, compression springs 41c and 41d are arranged side by side in parallel to the conveyance direction of the sheet S. The compression springs 41c and 41d are arranged substantially at the center of the reading unit 24 in the longitudinal direction of the reading unit 24.

The compression springs 41c and 41d press the reading unit 24 and the conveyance guide 33 via a contact member 42c, but the contact member 42c may be omitted. For example, the winding diameter of the compression spring 41c need only be sufficiently large such that one end of the compression spring 41c presses both of the reading unit 24 and the conveyance guide 33.

The contact member 42c includes a contact portion 421c. The contact portion 421c is engaged with or in contact with the back face of the conveyance guide 33. The contact member 42c includes two protruding portions 422c and 422d corresponding to the compression springs 41c and 41d. The compression spring 41c is fitted to the protruding portion 422c, and the compression spring 41d is fitted to the protruding portion 422d.

When the reading unit 24 moves such that the compression springs 41c and 41d extend, the contact portion 421c presses the conveyance guide 33, and the conveyance guide 33 pivots in a clockwise direction. When the reading unit 24 moves such that the compression springs 41c and 41d shrink, the reading unit 24 presses the engagement portion 332, and the conveyance guide 33 pivots in a counter-clockwise direction. In this way, the reading unit 24 and the conveyance guide 33 move in an interlocked manner. With this, the positional relationship between the reading unit 24 and the conveyance guide 33 is maintained in a predetermined relationship. Since the discharging member 34 is fixed to the conveyance guide 33, the positional relationship between the reading unit 24 and the discharging member 34 is also maintained in a predetermined relationship.

In the assembly process, first, the contact member 42c is attached to the reading unit 24. Next, one end of the compression springs 41c and 41d is fitted to the protruding portions 422c and 422d. The reading unit 24 is movably fixed to the internal frame 18. The conveyance guide 33 is caused to pivot, and the engagement portion 332 is attached to the back face of the reading unit 24 by snap fitting.

When the engagement portion 332 is replaced by the engagement structure described in relation to FIG. 10A or 10B, first, the compression springs 41c and 41d are fixed to the internal frame 18. Next, the contact member 42c is attached to the reading unit 24. Next, the reading unit 24 is engaged with the conveyance guide 33, and the contact member 42 engages with the back face of the conveyance guide 33. Moreover, as a result of causing the conveyance guide 33 and the reading unit 24 to pivot, the compression springs 41 are attached to the back face of the reading unit 24, and the protruding portion 241 is fitted into the recessed portion 183 of the internal frame 18.

Sixth Application Example

Figure 13A:
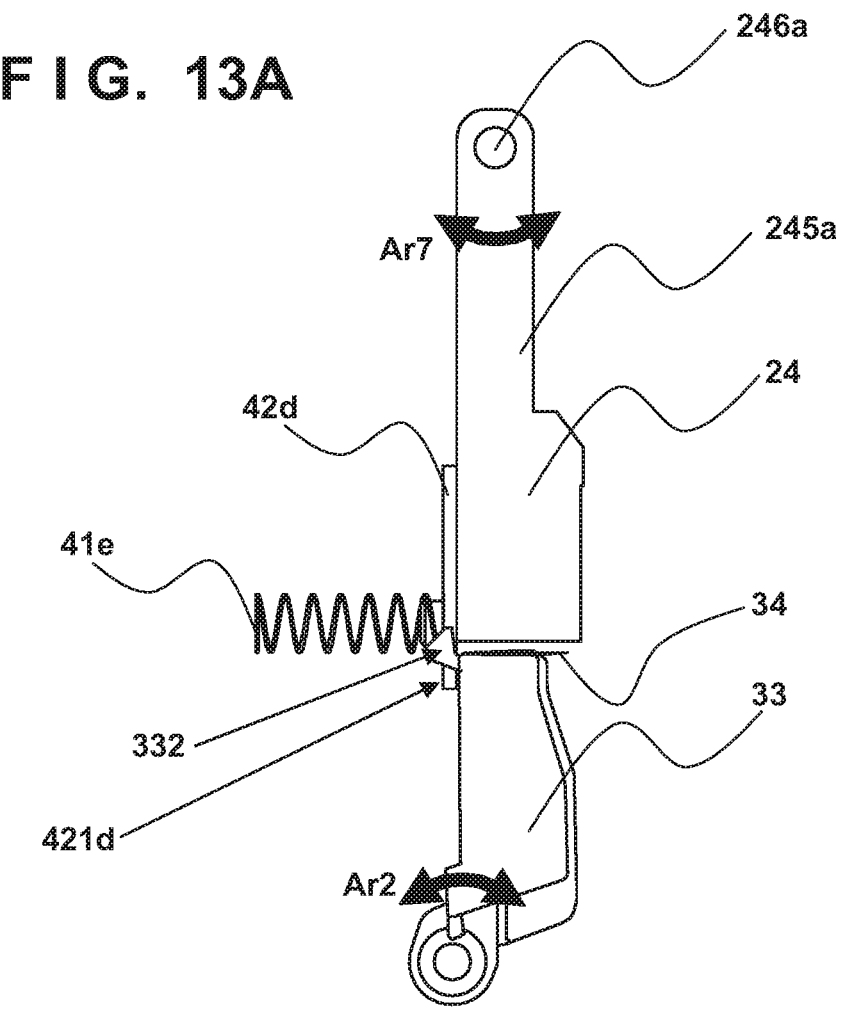
FIGS. 13A and 13B are diagrams illustrating a pressing member and a connection structure.
Figure 13B:
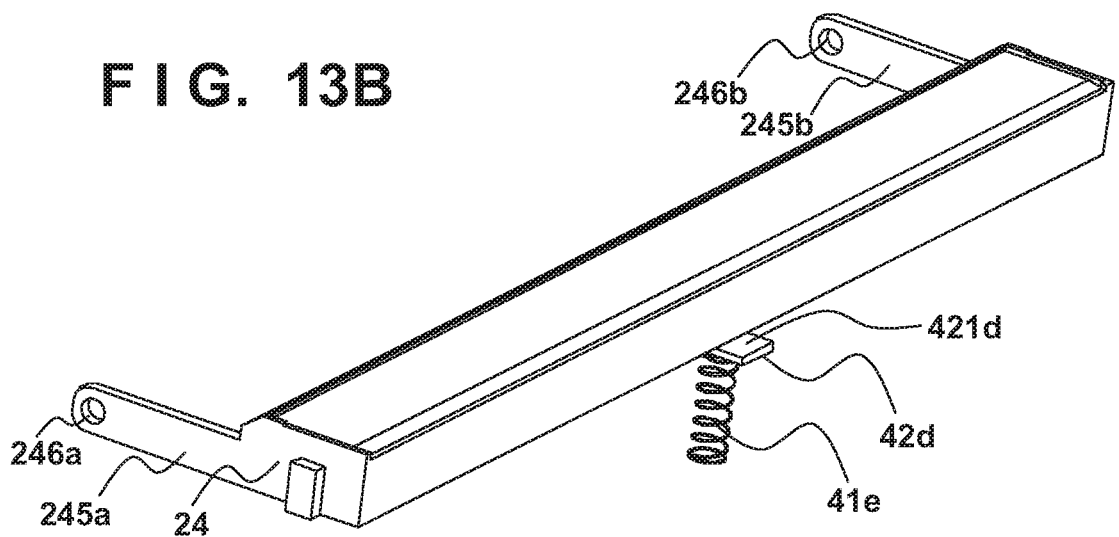

As shown in FIGS. 13A and 13B, the reading unit 24 includes pivot arms 245a and 245b at both ends thereof in the longitudinal direction. One end of the pivot arms 245a and 245b supports the main body of the reading unit 24. The other ends of the pivot arms 245a and 245b respectively include pivot shafts 246a and 246b. With this, the reading unit 24 moves and pivots in the direction indicated by an arrow Ar7 with the pivot shafts 246a and 246b functioning as a fulcrum.

According to FIGS. 13A and 13B, one compression spring 41e is provided so as to press the plate-shaped contact member 42. However, the compression springs 41a to 41d described above may also be adopted as the pressing unit in place of the compression spring 41e. The compression spring 41e and the contact member 42 are provided substantially at the center of the reading unit 24 in the longitudinal direction.

As shown in FIG. 13B, the compression spring 41e is in contact with the reading unit 24 and the conveyance guide 33 via a contact member 42d. A contact portion 421d of the contact member 42d is in contact with the conveyance guide 33. When a portion of the compression spring 41e directly comes into contact with the conveyance guide 33, the contact member 42d may be omitted.

According to FIG. 13A, the conveyance guide 33 includes an engagement portion 332. However, the engagement portion 332 may be replaced with the engagement structure described in relation to FIG. 10A or 10B.

When the reading unit 24 moves such that the compression spring 41e extends, the contact portion 421d presses the conveyance guide 33, and the conveyance guide 33 pivots in a clockwise direction. When the reading unit 24 moves such that compression spring 41 shrinks, the reading unit 24 presses the engagement portion 332, and the conveyance guide 33 pivots in a counter-clockwise direction. In this way, the reading unit 24 and the conveyance guide 33 move in an interlocked manner. With this, the positional relationship between the reading unit 24 and the conveyance guide 33 is maintained in a predetermined relationship. Since the discharging member 34 is fixed to the conveyance guide 33, the positional relationship between the reading unit 24 and the discharging member 34 is also maintained in a predetermined relationship.

In the assembly process, first, the contact member 42 is attached to the reading unit 24. Next, the compression spring 41e is attached to the contact member 42. The pivot shaft 246a of the reading unit 24 is pivotably attached to the image forming apparatus. As a result of causing the conveyance guide 33 to pivot, the engagement portion 332 is attached to the back face of the reading unit 24 by snap fitting. The order of attachment of the conveyance guide 33 and the reading unit 24 may be reversed.

When the engagement portion 332 is replaced with the engagement structure described in relation to FIG. 10A or 10B, first, the compression spring 41e is attached to the contact member 42d. Next, the contact member 42d is attached to the reading unit 24. The conveyance guide 33 and the reading unit 24 are gradually engaged while the conveyance guide 33 and the reading unit 24 are caused to pivot.

Seventh Application Example

In FIG. 1, the reading unit 24 is provided inside the image forming apparatus 100, but the reading unit 24 may be provided in the image reading apparatus. Note that the image forming apparatus 100 provided with the reading unit 24 is an image reading apparatus in a broad sense.

Figure 14:
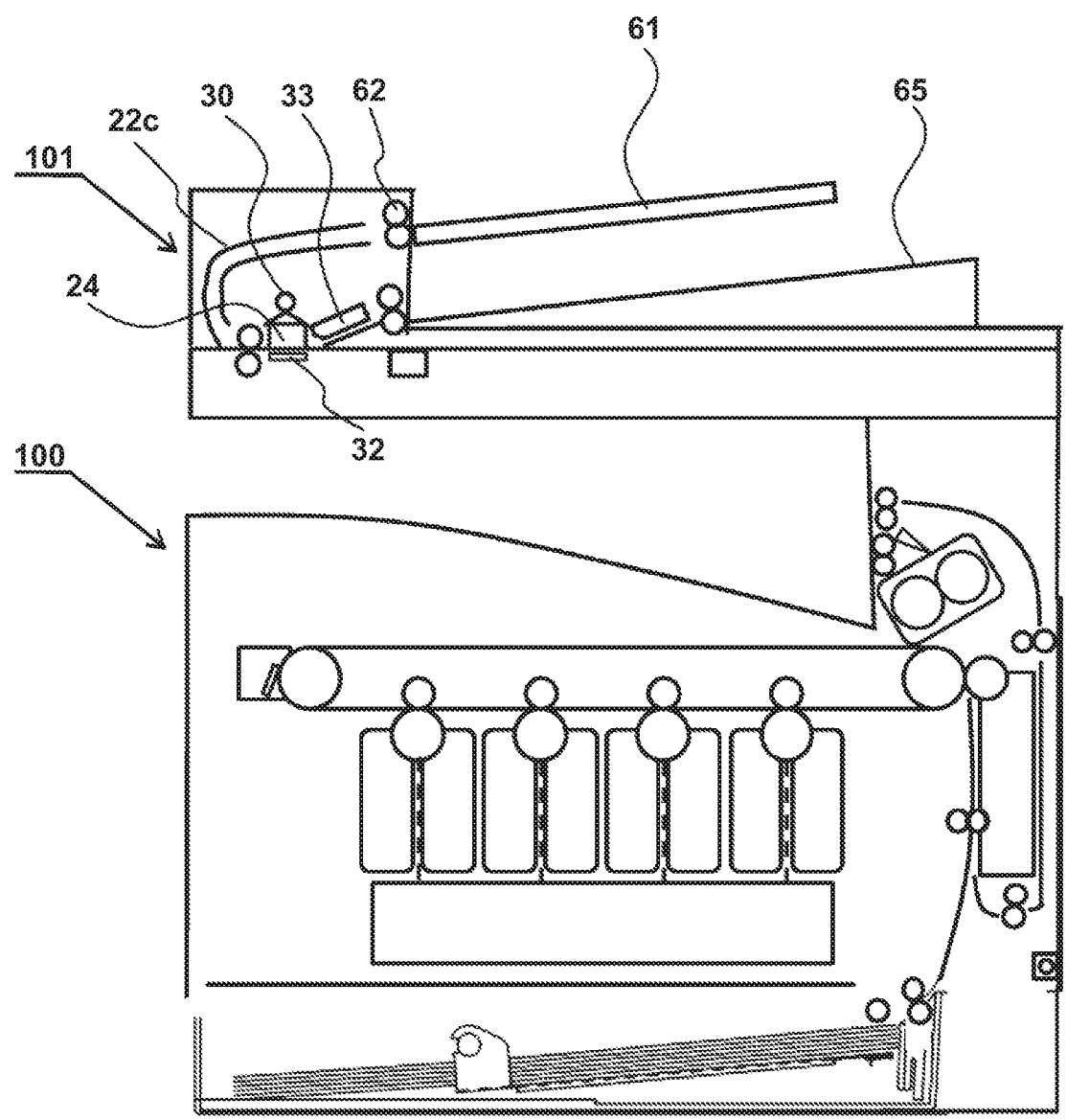
FIG. 14 is a diagram illustrating an image reading apparatus.

FIG. 14 illustrates the image forming apparatus 100 including an ADF 101. Since the image forming apparatus 100 has already been described, here, the ADF 101 will be described in detail. ADF is an abbreviation of Auto Document Feeder.

A roller 62 picks up a sheet S placed in a sheet feeding tray 61, and conveys the sheet S along a conveyance path 22c. The reading unit 24 and the conveyance guide 33 are provided in the conveyance path 22c. The ADF 101 discharges the sheet whose image has been read by the reading unit 24 to a sheet discharging tray 65.

The reading unit 24 is pressed by a torsion coil spring 30. The white reference plate 32 is arranged so as to oppose the reading unit 24. The reading unit 24 and the white reference plate 32 are arranged such that the gap between the reading unit 24 and the white reference plate 32 is constant. Any of the pressing units described in the first to sixth application examples may be adopted as the pressing unit of the reading unit 24. Also, any of the connection units described in the first to sixth application examples may be adopted as the connection unit of the reading unit 24 and the conveyance guide 33. Accordingly, the positional relationship between the reading unit 24 and the conveyance guide 33 can be maintained in a predetermined relationship. The discharging member 34 may be provided in the conveyance guide 33. In this case, the effects relating to the discharging member 34 are as described in the first to sixth application examples.

Embodiments Derived from Application Examples

A plurality of embodiments described below can be arbitrarily combined as long as there is no technical inconsistency.

The conveyance paths 22b and 22c are examples of a conveyance path that conveys a sheet on which an image has been formed. The reading unit 24 is an example of a reading unit that reads an image formed on a sheet in the conveyance path. The conveyance guide 33 is an example of a conveyance guide that forms a portion of the conveyance path and guides sheets. The torsion coil spring 30 and the compression spring 41 are examples of a pressing unit that presses the reading unit against a sheet. The engagement portion 332, the arm portion of the torsion coil spring 30, the protruding portion 244, and the like function as a connection unit that connects the reading unit and the conveyance guide such that the reading unit and the conveyance guide move in an interlocked manner. With the connection unit as described above, the reading unit and the conveyance guide move in an interlocked manner, and therefore, an apparatus can be provided that can accurately read an image while stably conveying a sheet.

As shown in FIG. 4 and the like, the discharging member 34 that operates with the conveyance guide 33 in an interlocked manner may be provided. As a result of the reading unit and the conveyance guide 33 moving in an interlocked manner, the discharging member 34 also operates with the reading unit and the conveyance guide 33 in an interlocked manner. Accordingly, the discharging performance expected on design may be easily exerted.

As shown in FIG. 4 and the like, the reading unit may be supported so as to be able to move in a direction intersecting with the conveyance direction of sheets. Even if a force in a direction normal to the sheet is exerted on the reading unit, the reading unit may easily follow the sheet.

As shown in FIG. 4 and the like, the conveyance guide may be arranged on a downstream side relative to the reading unit in the conveyance direction of sheets. When such an arrangement is adopted, the level difference formed between the conveyance guide and the reading unit may not hinder the conveyance of the sheets. For example, when the tip of a sheet is caught on the level difference, jamming of the sheet may occur. Also, a sheet passing sound may be easily generated. In particular, when the conveyance guide and the reading unit can independently move, this problem stands out. In the present invention, since the conveyance guide and the reading unit operate in an interlocked manner, the occurrence of sheet jamming and the generation of passing sound may be reduced.

As shown in FIG. 4 and the like, the pressing unit may include a torsion coil spring. With this, the pressing unit may be realized at a relatively low cost.

As shown in FIG. 8A and the like, the holding member 180 is an example of a holding member that holds a torsion coil spring. The holding member 180 may include a holding portion (e.g., attachment hole 181) for holding a coil portion of the torsion coil spring, and a support portion (e.g., wall portion 182) for supporting the two arm portions of the torsion coil spring. With this, the position of the reading unit may be regulated. As shown in FIG. 9B, the height L from the bottom face of the holding portion to the support face of the support portion may be greater than or equal to the sum of the inner diameter Di of the coil portion and the wire diameter d of the torsion coil spring. When this condition is satisfied, the torsion coil spring may be stably held.

Figure 12A:
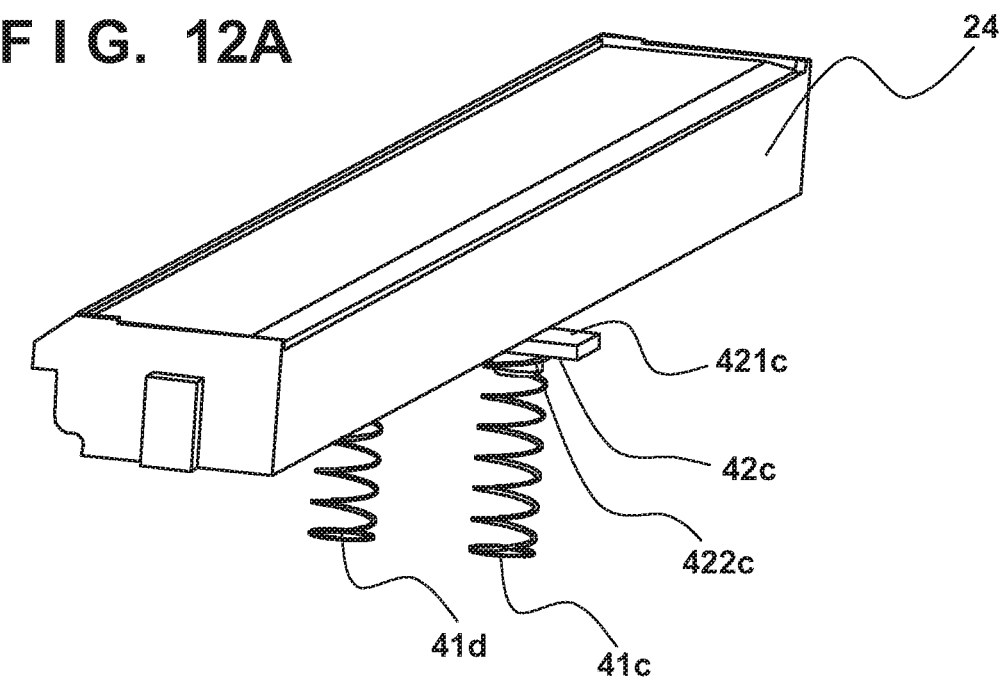
FIGS. 12A and 12B are diagrams illustrating a pressing member and a connection structure.
Figure 12B:
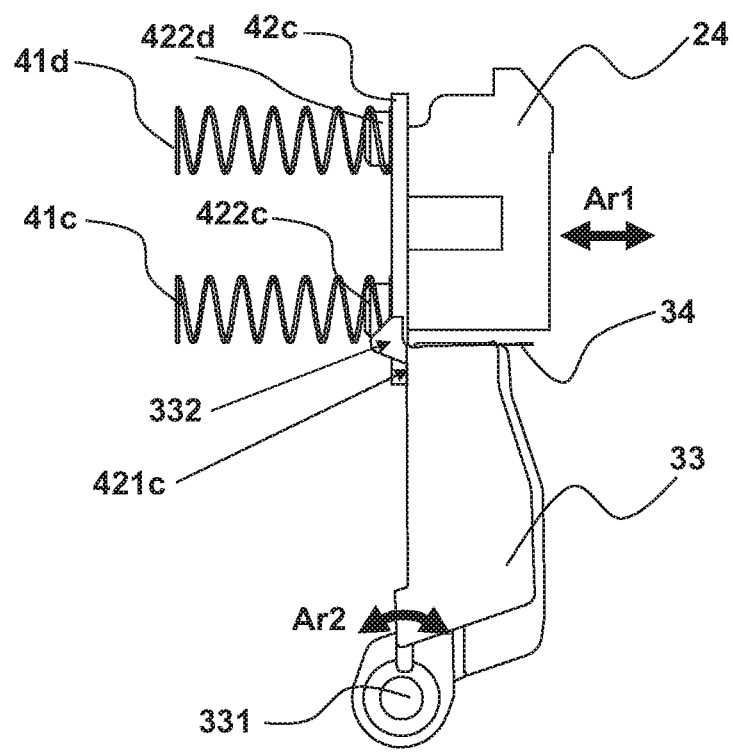

As shown in FIGS. 11A, 12A, 13A, and the like, the pressing unit may include one or more compression springs. As shown in FIG. 8C, the pressing unit may include a plate spring. There is no restriction on the type of the pressing member, as long as the reading unit 24 can be appropriately pressed. Note that, with the compression spring 41 or the plate spring 39, the contact area with the reading unit 24 or the contact member 42 can be increased relative to the torsion coil spring. Therefore, the reading unit 24 or the contact member 42 may be stably pressed.

The pressing unit may be configured so as to press the conveyance guide along with the reading unit. With this, a pressing force is easily exerted on the conveyance guide 33, and the interlocking between the reading unit 24 and the conveyance guide 33 may be assisted.

As shown in FIG. 11A and the like, the contact member 42 is an example of an engagement member that engages with both of the reading unit and the conveyance guide. The pressing unit may press both of the reading unit and the conveyance guide via an engagement member.

The connection unit may be provided in the conveyance guide, and include an engagement member (e.g., engagement portion 332) that engages with the reading unit. With this, the conveyance guide 33 and the reading unit 24 may be stably connected.

As shown in FIG. 11B and the like, the engagement member may include a protruding portion (e.g., protruding portion 422) that holds one end of a pressing unit by fitting to the one end of the pressing unit. With this, the pressing unit and the engagement member may be stably held.

As shown in FIGS. 7A and 10A, the connection unit may be a portion of the pressing unit. With this, the number of components may be reduced.

As shown in FIG. 10A, a portion of the pressing unit may be fitted to a groove-like or hole-like fitting portion (e.g., recessed portion 334) provided in the conveyance guide 33. With this, the conveyance guide 33 and the reading unit 24 may be stably connected.

As shown in FIG. 10B, the connection unit may include a first fitting portion (e.g., protruding portion 244) provided in the reading unit, and a second fitting portion (e.g., recessed portion 334) that is provided in the conveyance guide and is fitted to the first fitting portion. With this, the conveyance guide 33 and the reading unit 24 may be stably connected.

As shown in FIG. 10B, the first fitting portion may be the protruding portion 244. The second fitting portion may be a groove portion or a through hole (e.g., recessed portion 334). In this way, a relatively simple structure has been adopted, but the conveyance guide 33 and the reading unit 24 may be stably connected.

As shown in FIG. 8A, the internal frame 18 functions as a frame member that movably supports the reading unit. The protruding portion 241 is an example of a third fitting portion provided in the reading unit. The recessed portion 183 is an example of a fourth fitting portion that is fitted to the third fitting portion. With this, the reading unit 24 can move while the reading unit 24 is stably held by the internal frame 18.

As is understood from FIGS. 3 and 8A, the third fitting portion may protrude from the reading unit toward the frame member. The fourth fitting portion may include a groove or rail (e.g., recessed portion 183) that is provided in parallel to the moving direction of the reading unit. With the relatively simple structure as described above, the reading unit 24 can move while the reading unit 24 is stably held by the internal frame 18.

As shown in FIG. 13A and the like, the reading unit may be configured to include a first pivot shaft (e.g., pivot shaft 246), and pivot about the first pivot shaft. With this, the reading unit may be able to stably move.

As shown in FIG. 3 and the like, the conveyance guide may include a second pivot shaft (e.g., pivot shaft 331), and pivot about the second pivot shaft. With this, the conveyance guide may be able to stably move.

As shown in FIG. 5A, the discharging member 34 may include a metal plate or metal foil and brush-like conductive fibers. As shown in FIG. 5B, the discharging member 34 may include a metal plate having a saw-like leading end. The discharging member 34 may include a conductive nonwoven fabric or fibers. The discharging member 34 may move along with the conveyance guide 33 and the reading unit 24 in an interlocked manner without depending on the shape and material of the discharging member 34, as described above.

The image forming unit 7 is an example of an image forming unit that forms an image on a sheet. As shown in FIGS. 1 and 14, the reading unit may be configured to read an image formed on a sheet by the image forming unit.

The conveyance path 22a is an example of a first conveyance path for conveying a sheet to the image forming unit. The conveyance path 22b is an example of a second conveyance path, which is branched from the first conveyance path, for again conveying a sheet in which an image has been formed on its first face by the image forming unit to the first conveyance path. The reading unit and the conveyance guide are provided in the second conveyance path. As described above, the second conveyance path is a conveyance path through which a sheet passes when images are formed on both sides of the sheet, and therefore, the reading unit 24 may not be easily stained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-180720, filed Sep. 30, 2019, which is hereby incorporated by reference herein in its entirety.

What is claimed is:

1. An image forming apparatus comprising:
   an image forming unit that forms an image on a sheet;
   a conveyance path for conveying the sheet on which the image has been formed;
   a reading unit that reads the image formed on the sheet in the conveyance path;
   a conveyance guide that constitutes a portion of the conveyance path and guides the sheet;
   a pressing unit that includes a torsion coil spring and presses the reading unit against the sheet; and a holding member that holds the torsion coil spring and includes a holding portion that holds a coil portion of the torsion coil spring, and a support portion that supports two arm portions of the torsion coil spring.

2. The image forming apparatus according to claim 1, wherein the reading unit is supported so as to be able to move in a direction intersecting a conveyance direction of the sheet.

3. The image forming apparatus according to claim 1, wherein the conveyance guide is arranged on a downstream side of the reading unit with respect to a conveyance direction of the sheet.

4. The image forming apparatus according to claim 1, wherein one arm portion of the two arm portions presses the reading unit, and the other arm portion of the two arm portions presses the conveyance guide, and wherein the reading unit and the conveyance guide move with each other due to pressing by the torsion coil spring.

5. The image forming apparatus according to claim 4, wherein the height from a bottom face of the holding portion to a support face of the support portion is greater than or equal to the sum of an inner diameter of the coil portion and a wire diameter of the torsion coil spring.

6. The image forming apparatus according to claim 1, wherein the pressing unit includes one or more of the torsion coil spring.

7. The image forming apparatus according to claim 1, wherein the pressing unit is configured to press the conveyance guide along with the reading unit.

8. The image forming apparatus according to claim 7, further comprising:
an engagement member that engages with both of the reading unit and the conveyance guide,
wherein the pressing unit presses both of the reading unit and the conveyance guide via the engagement member.

9. The image forming apparatus according to claim 1, wherein the reading unit is configured to read the image that is formed on the sheet by the image forming unit.

10. An image forming apparatus comprising:
an image forming unit that forms an image on a sheet;
a conveyance path for conveying the sheet on which the image has been formed;
a reading unit that reads the image formed on the sheet in the conveyance path;
a conveyance guide that constitutes a portion of the conveyance path and guides the sheet;
a pressing unit that presses the reading unit against the sheet; and
a connection unit that connects the reading unit and the conveyance guide such that the reading unit and the conveyance guide move in an interlocked manner,
wherein the connection unit includes an engagement member that is provided in the conveyance guide and engages with the reading unit, and the engagement member includes a protruding portion that holds one end of the pressing unit by fitting to the one end.

11. An image forming apparatus comprising:
an image forming unit that forms an image on a sheet;
a conveyance path for conveying the sheet on which the image has been formed;
a reading unit that reads the image formed on the sheet in the conveyance path;
a conveyance guide that constitutes a portion of the conveyance path and guides the sheet;
a pressing unit that presses the reading unit against the sheet; and
a connection unit that connects the reading unit and the conveyance guide such that the reading unit and the conveyance guide move in an interlocked manner,
wherein the connection unit is a portion of the pressing unit, and the portion of the pressing unit is fitted to a groove-like or hole-like fitting portion provided in the conveyance guide.

12. An image forming apparatus comprising:
an image forming unit that forms an image on a sheet;
a conveyance path for conveying the sheet on which the image has been formed;
a reading unit that reads the image formed on the sheet in the conveyance path;
a conveyance guide that constitutes a portion of the conveyance path and guides the sheet;
a pressing unit that presses the reading unit against the sheet; and
a connection unit that connects the reading unit and the conveyance guide such that the reading unit and the conveyance guide move in an interlocked manner,
wherein the connection unit includes:
a first fitting portion provided in the reading unit; and
a second fitting portion that is provided in the conveyance guide and is fitted to the first fitting portion.

13. The image forming apparatus according to claim 12, wherein the first fitting portion includes a protruding portion, and
the second fitting portion includes a groove portion or a through hole.

* * * * *